(12) United States Patent
Nieminen et al.

(10) Patent No.: US 6,807,069 B2
(45) Date of Patent: Oct. 19, 2004

(54) DIRECT CURRENT CONVERTER WITH INTEGRATED TRANSFORMER WINDINGS AND OUTPUT VOLTAGE FILTERING COILS ON THE SAME MAGNETIC CORE

(75) Inventors: Pentti Nieminen, Helsinki (FI); Marko Laitinen, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/010,808

(22) Filed: Nov. 13, 2001

(65) Prior Publication Data

US 2002/0101739 A1 Aug. 1, 2002

Related U.S. Application Data

(63) Continuation of application No. PCT/FI00/00441, filed on May 6, 2000.

(30) Foreign Application Priority Data

May 18, 1999 (FI) .................................................. 991135

(51) Int. Cl.$^7$ ............................................. H02M 3/335
(52) U.S. Cl. ................... 363/17; 363/21.04; 363/21.06; 363/24
(58) Field of Search ............................. 363/15, 16, 17, 363/20, 21.01, 21.04, 21.06, 24

(56) References Cited

U.S. PATENT DOCUMENTS

| | | | | |
|---|---|---|---|---|
| 3,694,726 A | | 9/1972 | Cielo et al. | |
| 4,257,087 A | * | 3/1981 | Cuk | 363/16 |
| 4,675,796 A | * | 6/1987 | Gautherin et al. | 363/20 |
| 4,858,093 A | * | 8/1989 | Sturgeon | 363/20 |
| 4,864,478 A | | 9/1989 | Bloom | 363/16 |
| 4,961,128 A | * | 10/1990 | Bloom | 363/24 |
| 5,208,739 A | * | 5/1993 | Sturgeon | 363/24 |
| 5,440,472 A | * | 8/1995 | Sturgeon | 363/20 |
| 5,485,362 A | * | 1/1996 | Archer | 363/24 |
| 5,555,494 A | | 9/1996 | Morris | 363/17 |
| 5,737,203 A | | 4/1998 | Barrett | 363/75 |
| 5,784,266 A | * | 7/1998 | Chen | 363/17 |
| 5,790,005 A | * | 8/1998 | Stanti et al. | 363/16 |
| 5,907,479 A | | 5/1999 | Leu | 363/16 |

OTHER PUBLICATIONS

Liang Yan et al., "Integrated Magnetic Full Wave Converter With Flexible Output Inductor", Applied Power Electronics Conference and Exhibition, pp. 824–830, Mar. 10–14, 2002.

* cited by examiner

Primary Examiner—Jeffrey Sterrett
(74) Attorney, Agent, or Firm—Squire, Sanders & Dempsey LLP

(57) ABSTRACT

Chopper-type direct-current converter comprising a magnetic core (M), which comprises a first and a second side leg (MS1, MS2), the ends of which are connected to each other with end pieces, and a center leg provided with an air gap and connected to the end pieces between the first and the second side legs. According to the invention, the secondary side filter coil is wound around the center leg. The primary and secondary windings are wound around the side legs so that the magnetic flux produced by them flows in the same direction as the magnetic flux of the filter coil.

14 Claims, 11 Drawing Sheets

DIRECT CURRENT CONVERTER WITH INTEGRATED TRANSFORMER WINDINGS AND OUTPUT VOLTAGE FILTERING COILS ON THE SAME MAGNETIC CORE

This application is a continuation of international application serial number PCT/FI00/00441, filed May 16, 2000.

The present invention relates to direct-current current converters. In particular, the invention concerns a chopper-type direct-current converter, a chopper-type per-type regulator and methods for forming these.

BACKGROUND OF THE INVENTION

Today, power source constructions aim at a minimum size and a maximum power density, in other words, the aim is to maximize the power to volume ratio of the power source. An obstacle to the reduction of the size of power sources is the physical size of the components and the problem of heat production. The physical size of electronic components, especially semiconductors, is continuously diminishing. The largest components in a power source are magnetic components, such as transformers and filter coils. The size of the magnetic components can be reduced to a certain limit by increasing the switching frequency of the semiconductors. However, an obstacle to increasing the frequency are the losses occurring in the core material of magnetic components and in semiconductors as well as the generation of heat in power sources. If the size of the power source is reduced while the power dissipation remains the same, the surface area emitting heat to the environment is usually also reduced, resulting in a rise in the temperature of the power source. The heat produced is detrimental to other components as well when the power source is placed close to other electronics.

By increasing the switching frequency, it is possible to reduce the size of the magnetic components, but a high frequency results in further losses. It is not sensible to increase the frequency beyond a few hundred kilohertz. A space saving has also been achieved by replacing traditional tall wire-wound magnetic components with low planar structures.

Increasing the switching frequency from the present level to a level sufficient to allow a reduction of the size of magnetic components is not a viable solution in view of the overall effects. The effects produced in the windings by parasitic elements, such as e.g. the losses due to hysteresis of the core material and switching losses, are increased. The work performed by magnetic hysteresis cannot be restored into electric energy; instead, it is converted in the core material into losses, which again increase the temperature of the core material.

Hysteresis losses are increased as the frequency and the alternating component of the magnetic flux are increased. Hysteresis losses account for a substantial portion of the total power dissipation occurring in a magnetic component, such as a transformer or coil. Coil structures get saturated above a certain load current. The advantage achieved by reducing the size of magnetic components is not in proportion to the additional costs arising from the increased power losses.

One method for reducing the size of magnetic components is to integrate several magnetic components around the same magnetic core. Specification U.S. Pat. No. 5,555,494 presents a structure in which several magnetic components have been integrated around the same magnetic core. In the construction, an E-type magnetic core is utilized in which each side leg has an air gap while the center leg is of a continuous structure. Integrated around the magnetic core are the transformer windings and filter coils used for filtering the output voltage of the converter. In this solution, the filter coils are placed around the side legs of the magnetic core.

The object of the present invention is to eliminate the problems referred to above. A specific object of the invention is to disclose a new type of direct-current converter and a chopper-type regulator in which the transformer windings and the output voltage filtering coils are integrated on the same magnetic core. A further object of the invention is to disclose methods for forming a converter and a regulator as specified above.

BRIEF DESCRIPTION OF THE INVENTION

The invention concerns a method for forming a chopper-type direct-current converter. In this case, the direct-current converter is transformer coupled, so the current supply to the converter is isolated. In other words, there is no galvanic connection between the primary and secondary sides of the converter. The magnetic core of the converter comprises a first and a second side leg, the ends of which are connected to each other by end pieces, and a center leg provided with an air gap and connected to the end pieces between the first and the second side legs. The magnetic core is preferably an E-type structure. Disposed around the magnetic core are a primary winding, a secondary winding and a filter coil for the secondary side. In the method of the invention, the filter coil is placed around the center leg. The primary and secondary windings are so arranged around the side legs that the magnetic flux produced by them flows in the same direction with the magnetic flux of the filter coil.

In a preferred embodiment of the invention, four windings are provided on the primary side of the converter, connecting two windings in series around the first and second side legs. The windings are so arranged around the side legs that the magnetic flux generated by the windings flows in the same direction on each side leg. Further, on the secondary side of the converter, two windings are arranged around the first and second side legs so that the magnetic flux produced by the windings flows in the opposite direction relative to the primary winding placed on the same side leg. The direction of the magnetic flux is the same on each side leg when the magnetic flux can be thought of as circulating around the magnetic core, the path of the flux consisting of the side legs and the end pieces. Thus, the magnetic flux in the first side leg intensifies the magnetic flux in the second side leg.

In an embodiment, the primary windings are controlled by means of a first and a second switching element. Moreover, two capacitors are provided on the primary side, the first capacitor being connected between the switching elements and the second capacitor in parallel with the supply voltage.

In another embodiment, two switching elements and two capacitors are provided on the primary side of the converter, the first switching element being connected between two primary windings and the second switching element correspondingly in series between the other two primary windings. In addition, the first capacitor is connected from the first side of the first switching element to the second side of the second switching element, and the second capacitor is connected from the second side of the first switching element to the first side of the second switching element. The two sides of the switching element may be understood in different ways depending on the switching element; for example, in a MOSFET transistor, the drain is the first side and the source is the second side; similarly, e.g. in a bipolar transistor, the emitter may be the first side and the collector the second side. This definition may be made in accordance with the switching element in question, in a manner known to the person skilled in the art.

In an embodiment, four windings are provided on the primary side of the converter, two windings being connected in series around the first and the second side legs in such manner that the magnetic flux produced by the windings flows in the same direction on each side leg, the other two windings being so connected that the direction of the magnetic flux produced by them on the same side leg is opposite to the flux of the first two windings. Further, two switching elements and a capacitor are provided on the primary side, the first switching element being connected by one end in series with two primary windings and by the other end to the second pole of the supply voltage. The second switching element is connected in a corresponding manner with the other two primary windings. The capacitor is connected in parallel with the supply voltage.

In an embodiment, two switching elements, two capacitors and two windings are provided on the primary side in such manner that the switching elements and the capacitors form a half bridge circuit. The windings are so connected that the magnetic flux produced by the windings flows in the same direction on each side leg and the windings are connected by one end between the switching elements and by the other end between the capacitors.

In an embodiment, four switching elements, a capacitor and two windings are provided on the primary side in such manner that the switching elements form a full bridge circuit. Moreover, the capacitor is connected in parallel with the supply voltage. The windings are connected in series so that the magnetic flux 35 produced by the windings flows in the same direction on each side leg and the windings are connected by one end between two of the switching elements and by the other end between the other two switching elements.

The above-described embodiments may be combined with various embodiments of the secondary side. In one embodiment, the first end of the filter coil winding is connected between the windings on the first and the second side legs and its second end is connected to the first pole of the output voltage of the converter.

In an embodiment, a third and a fourth switching element are provided on the secondary side, connected in series with the secondary winding, and the second pole of the output voltage of the converter is disposed between the third and the fourth switching elements. It is also possible to replace the switching elements with diodes. In this case, the secondary side is provided with a first and a second diode connected in series with the secondary winding, and the second its pole of the output voltage of the converter is disposed between the first and the second diodes.

In an embodiment, at least two different voltage outputs are provided on the secondary side, by providing two windings around the first and the second side legs for each voltage output. The voltage outputs may either be floating or they may have a common ground.

The invention also concerns a method for forming a chopper-type regulator, comprising a magnetic core as described above, with two windings and a filter coil placed around it. The regulator differs from the converter in that a galvanic connection exists between the input and output voltages. In the method, a filter coil is disposed around the center leg and the windings are placed around the side legs so that the magnetic flux produced by them flows in the same direction with the magnetic flux of the filter coil.

The invention further concerns a chopper-type direct-current converter which comprises a magnetic core, a secondary winding and a secondary side filter coil, as described above. In the converter of the invention, the filter coil is wound around the center leg and the primary and secondary windings are wound around the side legs so that the magnetic flux generated by them flows in the same direction with the magnetic flux of the filter coil.

Moreover, the invention concerns a chopper-type regulator comprising a magnetic core as described above, two windings and a filter coil. According to the invention, the filter coil is arranged around the center leg and the windings are arranged around the side legs so that the magnetic flux generated by them flows in the same direction with the magnetic flux of the filter coil.

The advantages of the invention include the fact that the power source can be designed around a single standard type magnetic core. This allows considerable advantages to be achieved both in design and in manufacture. The solution presented allows more effective utilization of the capacity of the magnetic flux density. Reducing the number of separate filter coils decreases the size of the power source and therefore improves its power density. At the same time, the magnetic core can be relatively effectively utilized. In large production quantities, significant cost savings in core material are achieved.

As compared with the traditional transformer solution, the flux variation on the center leg is diminished, resulting in smaller hysteresis and eddycurrent losses in the magnetic core.

Thanks to the structure of the input stage, the drawbacks resulting from the capacitance between large primary windings typical of the push-pull topology can be eliminated, thus eliminating the large current peaks at turn-on of the power semiconductors. This feature reduces the need for filtering in current measurement and it also reduces the current load of the semiconductors. As the decoupling capacitor between the primary switches is charged while the switches are in the non-conduction state, this produces a continuous primary current with a very low ripple. No separate input filter coil is needed, and the electromagnetic interference (EMI) of the input is very small.

In the continuous operating range, the energy stored in the center leg air gap produces a continuous current at the output regardless of the position of the primary switches. This energy is partly discharged via the side leg windings and partly via the center leg winding. Therefore, no separate filter coil is needed at the output. In addition, the side leg secondary windings conducting in push-pull mode allow the use of full wave rectification in which the current load can be distributed equally between two components.

As compared with buck and flyback type power source solutions, the magnetic material can be effectively utilized because magnetization on the side legs of the core occurs in different directions depending on the switching cycle. For the same reason, full wave rectification and other full wave converter principles can be utilized in the analysis.

When considering the operation of the component, we can see that the magnetizing inductance of one transformer is in series with the other transformer. Therefore, in respect of its properties, the component is in a manner a current-fed transformer. Because of this property, current mode control is very well applicable in the control of the component. The series connection of the magnetizing inductance provides an advantage especially in cases of output short circuit and other failure situations, preventing uncontrolled increase of the current.

With the reduction in the operating voltages of electronic circuits, it has become necessary to develop various synchronous rectification methods. The topology described in the present application is also well applicable for use in conjunction with synchronous rectification.

LIST OF ILLUSTRATIONS

In the following, the invention will be described by the aid of a few examples of its embodiments with reference to the attached drawing, wherein FIG. 1 presents a diagram representing an embodiment of the direct-current converter of the invention;

FIG. 7a–7d present embodiments for use as secondary side circuits; and

Figure 6A:
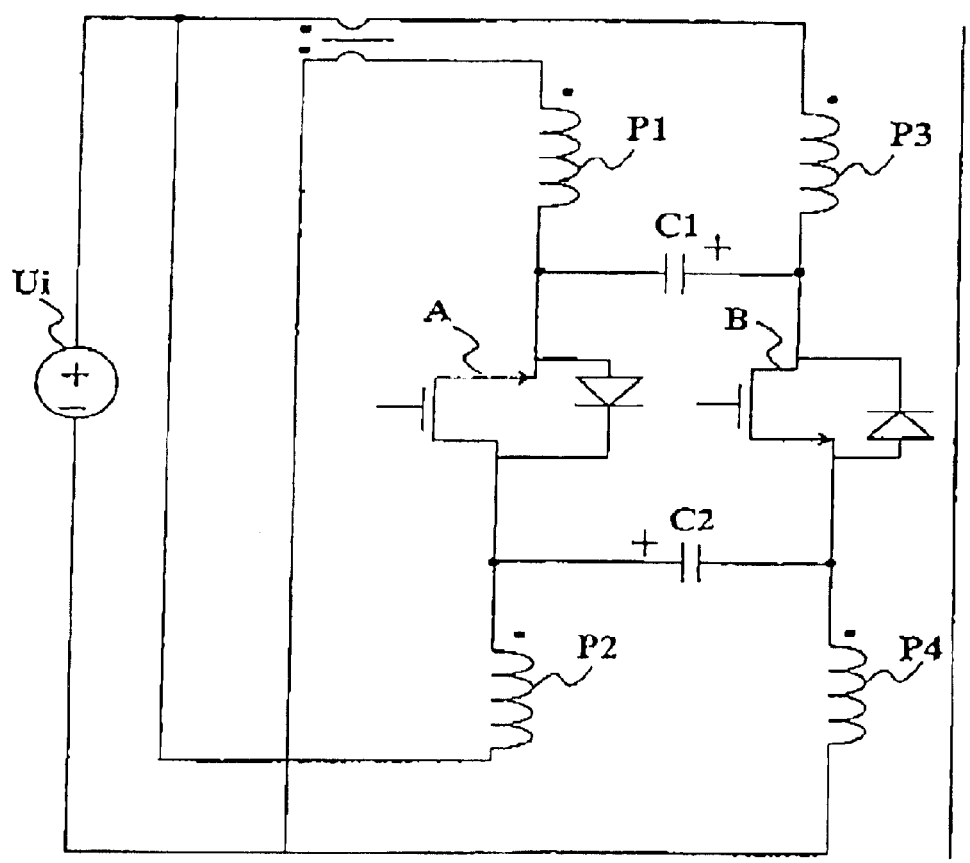
FIG. 6a–6d present embodiments for use as primary side circuits.
Figure 6B:
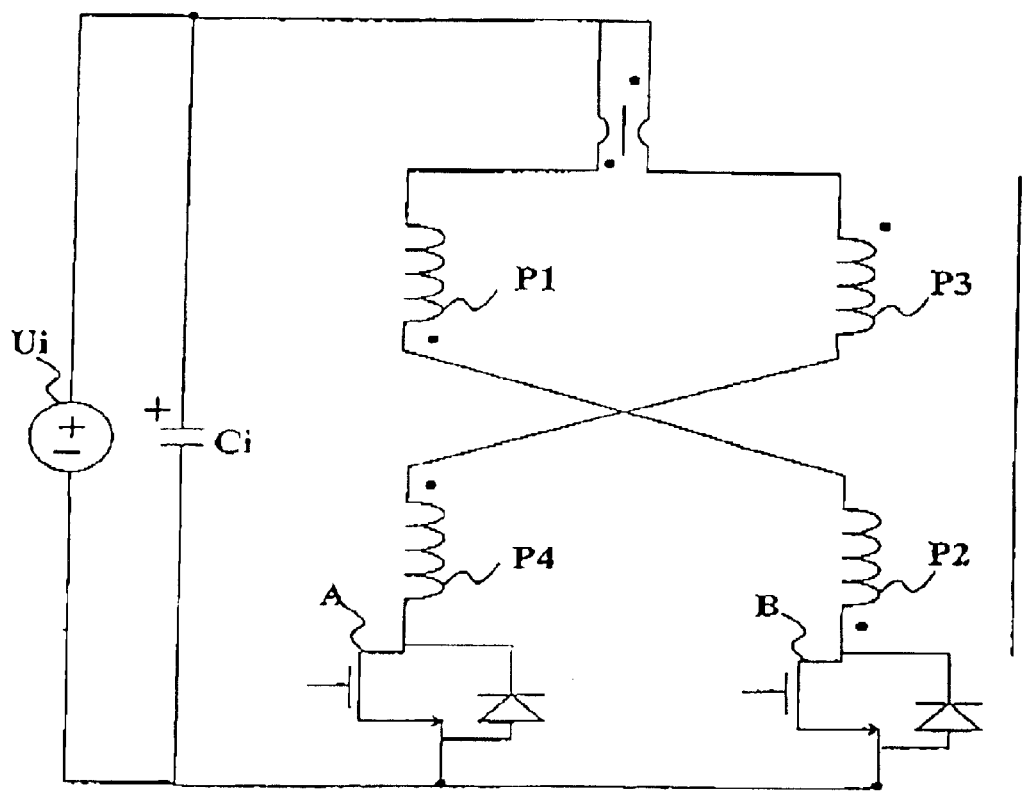
Figure 8A:
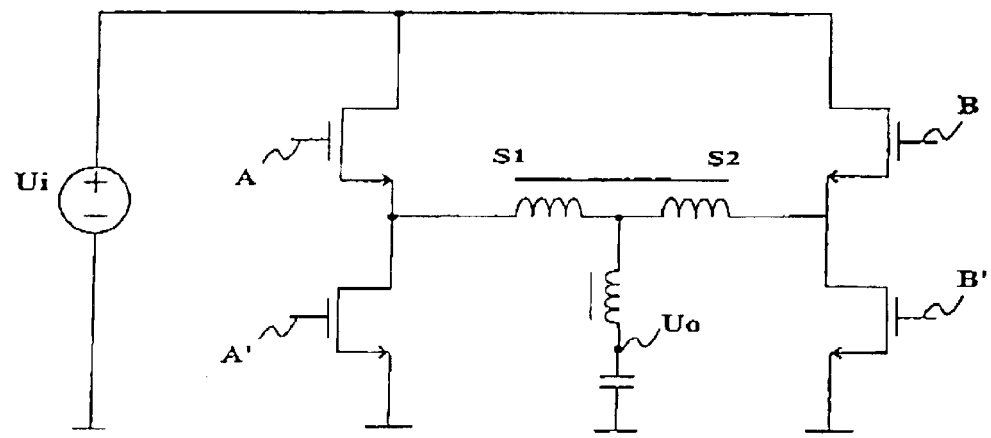

FIG. 8a and 6b present different embodiments for use as chopper regulators.

DETAILED DESCRIPTION OF THE INVENTION

Figure 1:
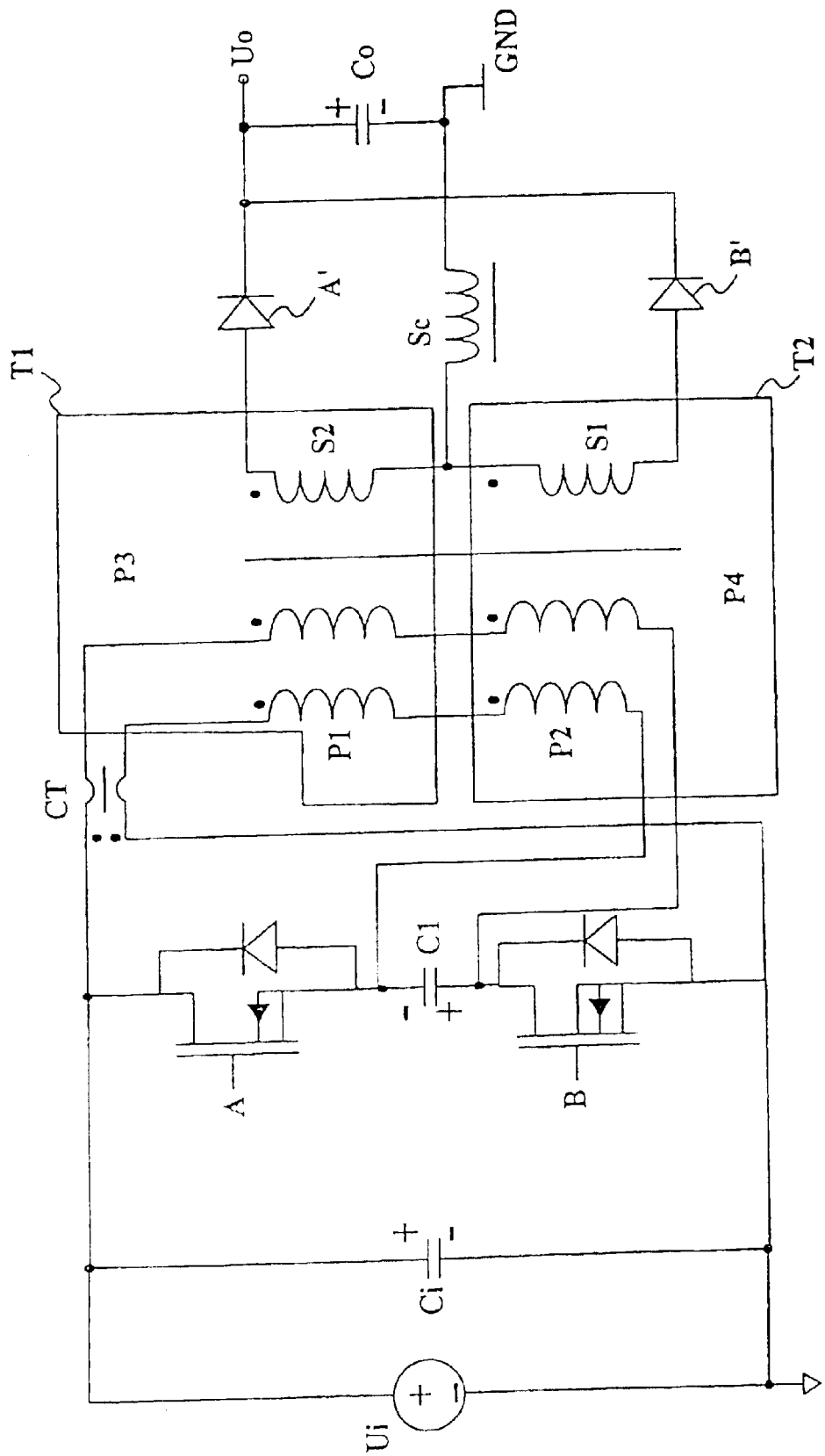

FIG. 1 presents the structural principle of the direct-current converter of the invention. The direct-current converter converts a d.c. input voltage into a d.c, output voltage. In the figure the following notations and abbreviations are used:

Ui is the voltage source feeding the converter;
Ci is an input filter capacitor;
A and B are primary side switching elements;
C1 is a capacitor between the primary windings;
P1–P4 are primary windings distributed on the side legs;
S1 and S7 are secondary windings distributed on the side legs;
Sc is a secondary winding on the center leg;
A'and B'are secondary side switching elements or. diodes of a diode rectifier; and
Co is an output filter capacitor.

In the figure, the dot markings on the windings indicate the polarity of the windings with respect to winding P1. CT is a current measuring transformer connected in series with the primary windings of the component, used in current mode control. The magnetic core M is an E-type ferrite core preferably made in a planar form. The magnetic core M comprises two side legs MS1, MS2. The side legs MS1, MS2 are connected to each other via end pieces MP1, MP2. The side legs MS1, MS2 and the end pieces MP1, MP2 form a substantially continuous structure having no air gaps in it. The center leg MK has been fitted between the side legs MS 1, MS2 by connecting it to the end pieces MP1, MP2. The center leg ML is provided with an air gap G.

The primary windings P1–P4 have been wound around the side legs MS1, MS2 so that two windings are connected in series around opposite side legs. Thus, e.g. primary winding P1 has been wound around side leg MS1 and primary winding P2 around side leg MS2. The winding direction of the windings is such that the magnetic flux generated by them can be thought of as circulating in the same direction along the outer "circle" of the magnetic core M consisting of the side legs MS1, MS2 and the end pieces MP1, MP2. The secondary windings S1, S2 have been wound around the side legs MS1, MS2 and the filter coil Sc around the center leg MK.

Figure 2:
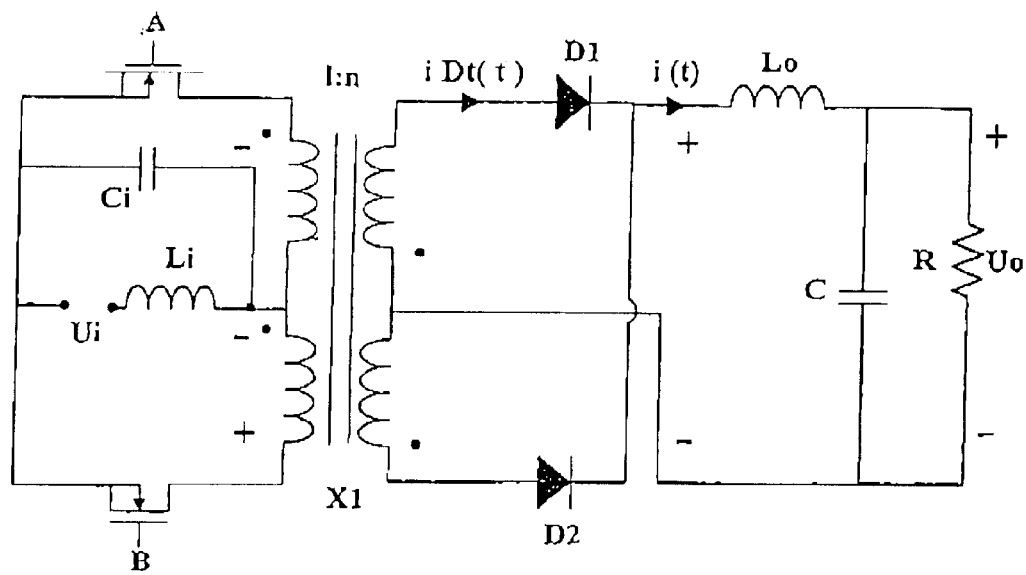
FIG. 2 represents a prior-art switched-mode power supply.

FIG. 2 illustrates a prior-art push-pull power source with the magnetic components placed in separation from each other. The topology of the invention optimizes' the size and amount of magnetic components of a DC-DC switched-mode power supply (DC, Direct Current) in that the input current filtering coil Li, the transformer X1 and the output current filtering coil Lo of a push-pull power source as presented in FIG. 2 are integrated in the same component.

In the solution of the invention, the primary circuit consists of a special input stage decoupled by a capacitor C1, in which the adverse effects of stray capacitance appearing in the windings have been eliminated. The actual primary winding P1–P4 consists of a series connection of the primary windings P1–P2 and P3–P4 of two symmetrical transformers. The transformers are symmetrically disposed on the side legs MS1, MS2 of the magnetic core M. Regardless of the special input stage, the regulating circuit used may be an ordinary regulating circuit operating on the current mode principle of a push-pull power source.

The supply of the input voltage Ui to the primary windings P1–P4 can be divided in time into. two half-cycles, a separate half-cycle being supplied to each primary winding P1–P2, P3–P4 as in ordinary push-pull topology. During the first half-cycle, one of the secondary windings on the side legs and the winding on the center leg conduct the current induced in the secondary winding by the primary current as well as the energy stored in the respective half of the magnetic core during the preceding half of the switching cycle into the secondary winding. At the same time, energy is stored in the magnetic flux of the non-conducting secondary winding. During the next half of the switching cycle, the roles of the windings are reversed. In principle, the situation is such that one of the side legs MS1, MS2 functions as a current transformer while the other one is acting as a coil. At the instant when neither one of the switches A, B is conducting, the input current flows through the primary windings into the capacitor C1, smoothing the current pulses. Therefore, the input need not be provided with a filter coil. At the output, the energy stored in the magnetic core M is correspondingly discharged via the two secondary windings SI, S2 and the center leg winding Sc, so there is no need for a separate output filter coil.

Figure 3:
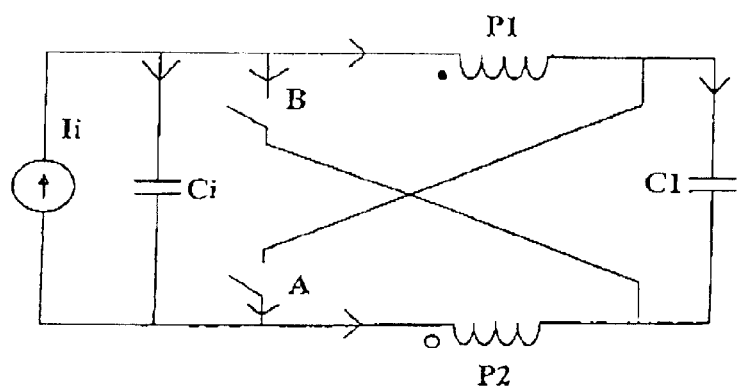
FIG. 3 represents an input stage according to an embodiment of the present invention.

Let us consider the operation of the input stage in a static operating situation where the output current lo and output voltage Uo are constant. In this case, the input current and the width of the control pulses of the switches A, B are constant as well. In an analysis of the operating principle of the input stage, the secondary side of the magnetic components can be considered as being ideal in respect of stray inductances and stray capacitances. The primary side can be depicted as a separate assembly as in FIG. 3, where Ii is the current source feeding the structure, Ci is an input filter capacitor and C1 is a decoupling capacitor between the windings. P1 and P2 are the primary windings and A and 13 are the primary switches. At this point of the analysis, the capacitors are assumed to be very large. The magnetic coupling between the windings is denoted by dots so that when a positive voltage is applied to the dotted end of the winding, a positive voltage is induced in the dotted end of the other winding. The positive direction of the currents is indicated in the figure by arrows.

Figure 4:
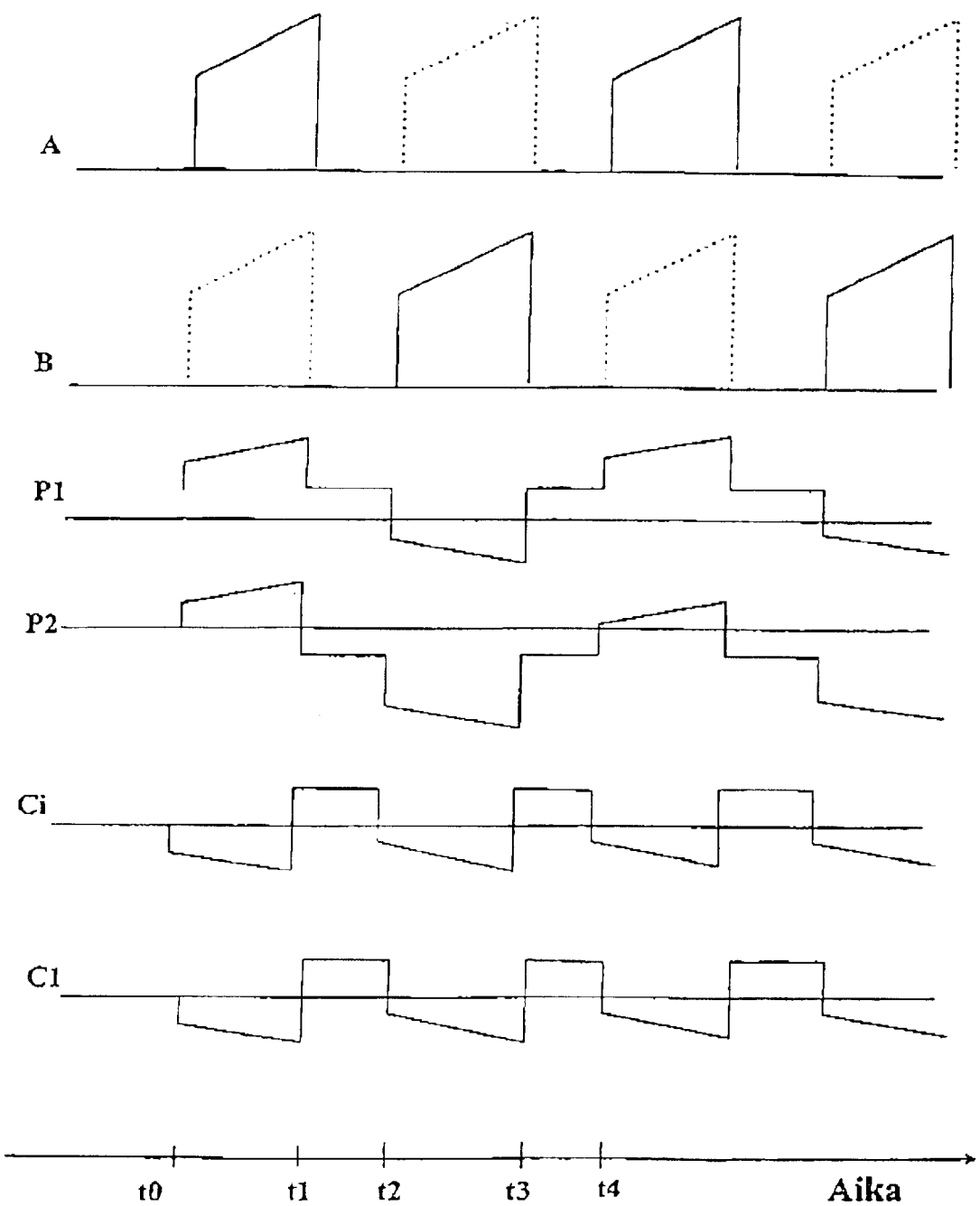
FIG. 4 illustrates the curve forms of the currents in the input stage presented in FIG. 3.

Referring to FIG. 4, let us now consider the curve forms of the currents in different components. The current source Ii continuously supplies a constant current. At instant t0, switch B is kept non-conducting and switch A is turned on, whereupon a current flows from the current source Ii and the input filter capacitor Ci through winding P1. At the same time, the capacitor between the windings is discharged through winding P2 and switch A. Thus, switch A conducts the current of both winding P1 and winding P2. Considering the polarity of the current supplied to windings P1 and P2, we can see that the current flows in at the dotted end of each winding. Therefore, both windings magnetize the magnetic core M in the same direction and power is transferred to the conducting secondary winding. The slow increase of the current is due to the magnetization inductance caused by the megnetic core M. During the switching cycle, the capacitors Ci, C1 smooth out the ripple of the current, so they are discharged.

At instant t1, switch A is turned on and switch remains in the non-conducting state, so no current is flowing through either one of the switches A, B. The capacitors C1, C1 were discharged during the previous switching cycle, so they are charged by the current supplied. The current supplied now flows through both of the primary windings P1, P2. Observing the polarity of the current, we can see that the current is flowing in through the dotted end of winding P1 and out through the dotted end of winding P2. Opposite magnetization of the windings means that the primary winding is not transferring any energy to the output and no energy is being stored in the magnetic flux of the magnetic core M, either. For this reason, the current supplied to the primary side remains constant between instants t1–t2, and no significant power losses occur.

Switch B is turned on at instant t2 while switch A remains in the non-conducting state. The current fed in begins to flow between switch B and through winding P2 while capacitor C1 is being discharged through switch B and winding P1. Observing the polarity of the currents in the windings, we can see that the current is flowing out through the dotted end of each winding, power being thus transferred to the secondary side while energy is stored in the magnetic flux of the magnetic core M. The capacitors C1, C1 are discharged, smoothing out the ripple of the current. It can be seen that, in respect of magnetization of the core M and power transfer to the secondary side, switching cycle t2–t3 is in opposite phase as compared with time interval t0–t1.

During time interval t3–t4, neither one of the switches A, B is conducting and current is flowing through both primary windings P1, P2, charging the capacitors C1, C1 without transferring energy either to the secondary side or to the magnetic core M. This time interval is identical with time interval t1–t2. At instant t4, switch A is turned on, and this instant corresponds to instant t0.

As compared with the conventional push-pull primary construction, the present design provides the following advantages. During the switching cycle of the semiconductors, only one of the primary windings in a conventional push-pull primary arrangement conducts all the current. As only one of the primary windings is conducting, the current density in the winding is increased, giving rise to resistive losses. As the current in the construction described flows through both primary windings, the entire primary side windings are made effective use of and the current density in the windings is considerably reduced. In addition to the reduction of current density, the effective value of the winding currents and the content of harmonic frequencies are smaller than those of the switched currents.

As a result of these circumstances, the losses in the windings are smaller than in a conventional push-pull implementation. Alternatively, the windings can be implemented using wires of a smaller cross-section.

A significant advantage is achieved in the capacitance between the primary windings P1, P2. The primary windings of a normal push-pull transformer are made by winding two wires at the same time so that the turns of the two windings lie very close to each other. This manner of winding results in capacitance between the windings. At turn-on of the semiconductors, this capacitance is suddenly discharged, producing a large current spike. The current spike again increases the current load on the semiconductors. In addition, stray capacitance causes oscillation with parasitic inductances. The current spike is a source of problems in current mode control, where a measured current value is used as a feedback quantity. To prevent incorrect operation, the current spike has to be filtered out from the measurement signal. The filtering again results in a delay in the feedback loop and may impair the stability of the system.

Figure 1A:
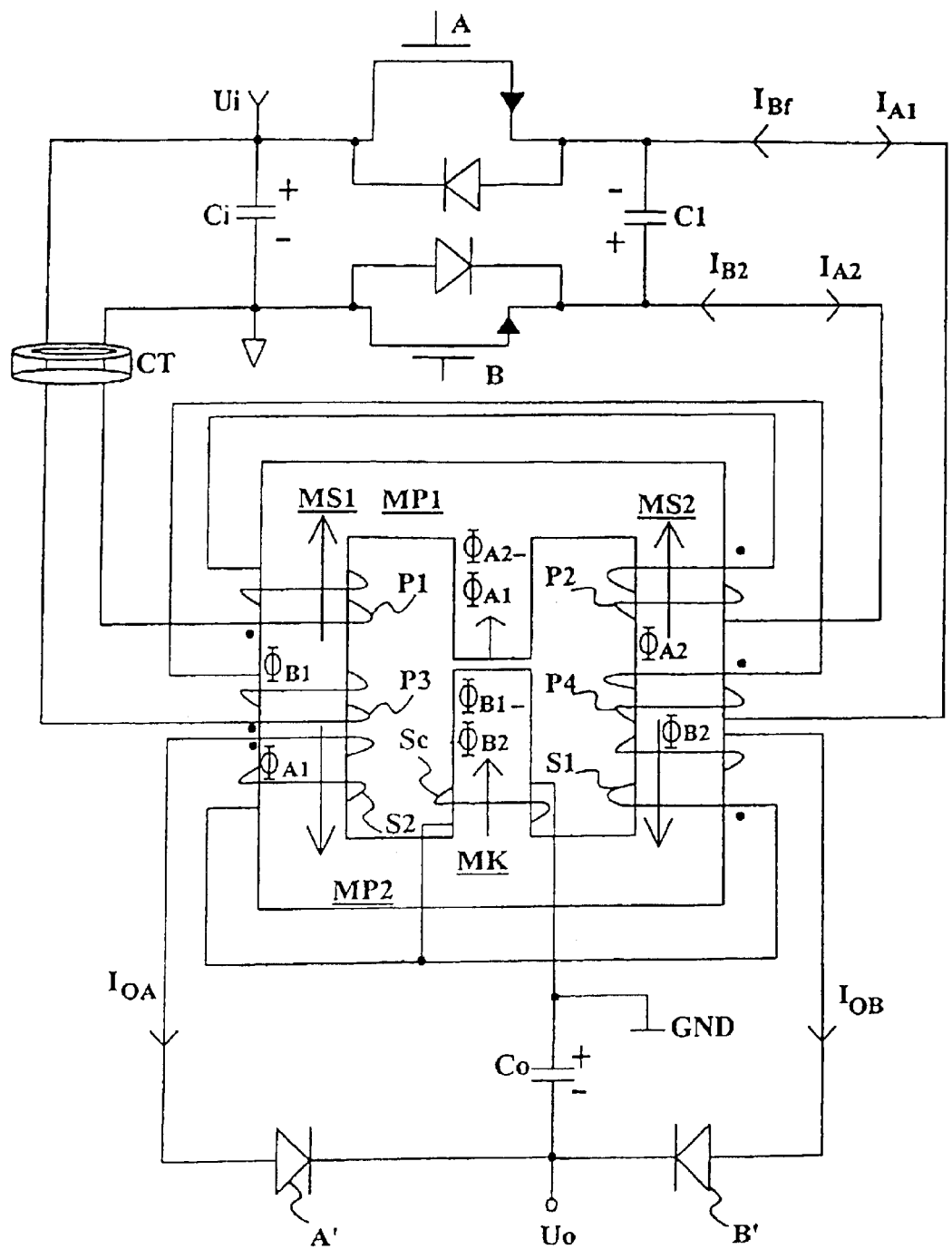

In the topology presented, the primary windings P1–P4 can be wound around the core M in the same way as in traditional push-pull topology. A capacitance appears between the windings as in the case discussed above. This time, a capacitor is placed between the windings, and the switches A, B are rearranged as in FIG. 1a. We can observe that the capacitance between the windings P1–P4 is almost negligible as far as the switching action is concerned. A capacitor is connected between the windings to increase AC coupling between the ends of the windings, i.e. stray capacitance. This construction eliminates switching current spikes and reduces the need for filtering in current measurement.

The most important properties of the input stage relate to the problems arising from stray inductance. In the construction used, the energy of stray inductance can be returned to the supply voltage, so the losses are diminished. In the conventional pushpull construction, large voltage spikes appear in the turn-off transient of the primary switches. The structure of the input stage effectively limits the spikes to a magnitude of twice the supply voltage.

To understand the operation of the component, we can consider the component as consisting of two separate transformers as illustrated in FIG. 1b. The first transformer T1 consists of primary windings P1, P3 and secondary winding S2. The second transformer T2 correspondingly consists of primary windings P2, P4 and secondary winding S1. Each one of the primary windings P1–P4 has an equal number of turns. Likewise, both secondary windings S1, S2 have the same number of turns. The desired transformation ratio is determined by the proportion of the numbers of turns in the primary and secondary windings. The choice of the transformation ratio depends on the range of variation of input voltage and on the desired level of output voltage. Connected to the output is a filter coil Sc to smooth out the ripple of the current. The primary windings of the transformers are connected in series, the dots in the transformers indicating the direction of current flow. If the current in the primary winding flows in through the dotted end, then the current in the secondary winding flows out through the dotted end. The magnetic cores provided with air gaps have been so selected that the air gap can store an amount of energy that is equal or greater than the amount of energy transferred to the output while one primary switch is conducting.

As shown in FIG. 1. the switching elements A' and B' on the secondary side are so connected that A' rectifies the current of winding S2 and B'rectifies the current of winding S1. The output current filter coil Sc is connected to the ground conductor of the output. The output current filter capacitor Co is assumed to be ideal and very large, so it completely smoothes out the ripple of the output voltage Uo. The first and second switching elements A, B are controlled by a suitable regulating circuit which keeps the output voltage Uo at a given value. In one embodiment, the secondary switching elements A' and B' work in opposite phase relative to the primary switching elements A, B. The switching elements A, B, A', B' may be e.g. MOSFET transistors or corresponding power semiconductor switches. In one embodiment, switching elements A', B' are implemented using diodes for the rectification.

In the description of operation, the load is assumed to remain constant and therefore the control of the power'semiconductors is also assumed to remain constant. In stable operating conditions, capacitor C1 is charged to the supply voltage Ui via the primary windings P1 –P4. The switches A, B on the primary side are assumed to conduct in pushpull mode as stated above in the description of the input stage.

When switch A is conducting, a current starts to flow from the supply voltage Ui through windings P1 and P2 to ground. At the same time, capacitor C1 begins to discharge through windings P3 and P4. Thus, a potential equal to the supply voltage prevails across each pair of windings. The distribution of the current between the pairs of windings is a linear function of the pulse ratio.

As the current in windings P2 and P4 is flowing out through the dotted end, the current in secondary winding S1 is flowing in through the dotted end and switching element B' conducts the current to the output. Similarly, in windings P1 and P3 the current flows out through the dotted end, so in secondary winding S2 a current tends to flow in through the dot5 ted end. However, switching element A' blocks the flow of the current and therefore the current flowing through windings P1 and P3 magnetizes the core of transformer T1, in other words, the current stores energy in the core of the transformer. The supply voltage is distributed among the windings connected in series in such manner that the voltage across windings P2 and P4 is limited by the output voltage Uo multiplied by the transformation ratio. The rest of the voltage remains across windings P1 and P3. As the current is flowing through the coil connected to ground at the output, energy is stored in the coil.

The filter coil Sc transfers the magnetic energy stored in it to the output at an instant when neither one of the switches A, B is conducting. Thus, the filter coil Sc maintains the current at the output. At the same time, the magnetization energy of transformer T1 is discharged to the output. When switch B is conducting, the situation is the reverse of the situation where switch A is conducting. Transformer T1 conducts current to the output and transformer T2 stores energy in the magnetic field of the core material M. Due to these identical push-pull switching cycles, the transformers are symmetrical with respect to each other and a full wave rectifier can be used at the output. As the primary windings P1–P4 are series connected, the voltage remaining across the energy storing transformer should be at least half the supply voltage, otherwise operation is not possible.

If the operation is observed considering the magnetic aspects when switch A is conducting, the following circumstances can be recognized. Transformer T2 provides a magnetic path for the magnetic field which connects windings P2 and P4 to the winding S1 conducting the current to the output. At the same instant, transformer T1 functions as a coil connected in series with transformer T2. T1 stores energy in the magnetic field in the air gap G. The energy stored in transformer T1 is transferred to the output when the switches are in the non-conducting state, or at the latest when switch B is conducting. The operation could also be described as a series connection of buck and flyback type transformers in which the transformers interchange their functions in alternate cycles. With one of the transformers functioning as a coil, the properties of a current-fed power source are achieved. The current in the primary switches will not increase uncontrollably even if the secondary windings should be momentarily short-circuited. The increase of the primary current is limited to the level of the increase of the magnetizing current of the transformer functioning as a coil.

The solution of the invention combines the magnetic paths of the magnetic components of the above-described power source with two transformers T1, T2 and an output filter coil Sc. By combining the magnetic paths, an integrated construction is achieved in which only one magnetic core M is needed instead of three cores as in the older solution. An analysis is performed in accordance with the notation used in FIG. 5. In the analysis, flux models based on voltages are used.

The operation is considered by dividing it into four time intervals. Time interval t0–t1 represents a situation where switch A is conducting, in time interval t1–t2 neither switch is conducting, switch B is conducting during t2–t3, and during t3–t4 neither switch is conducting.

Figure 5:
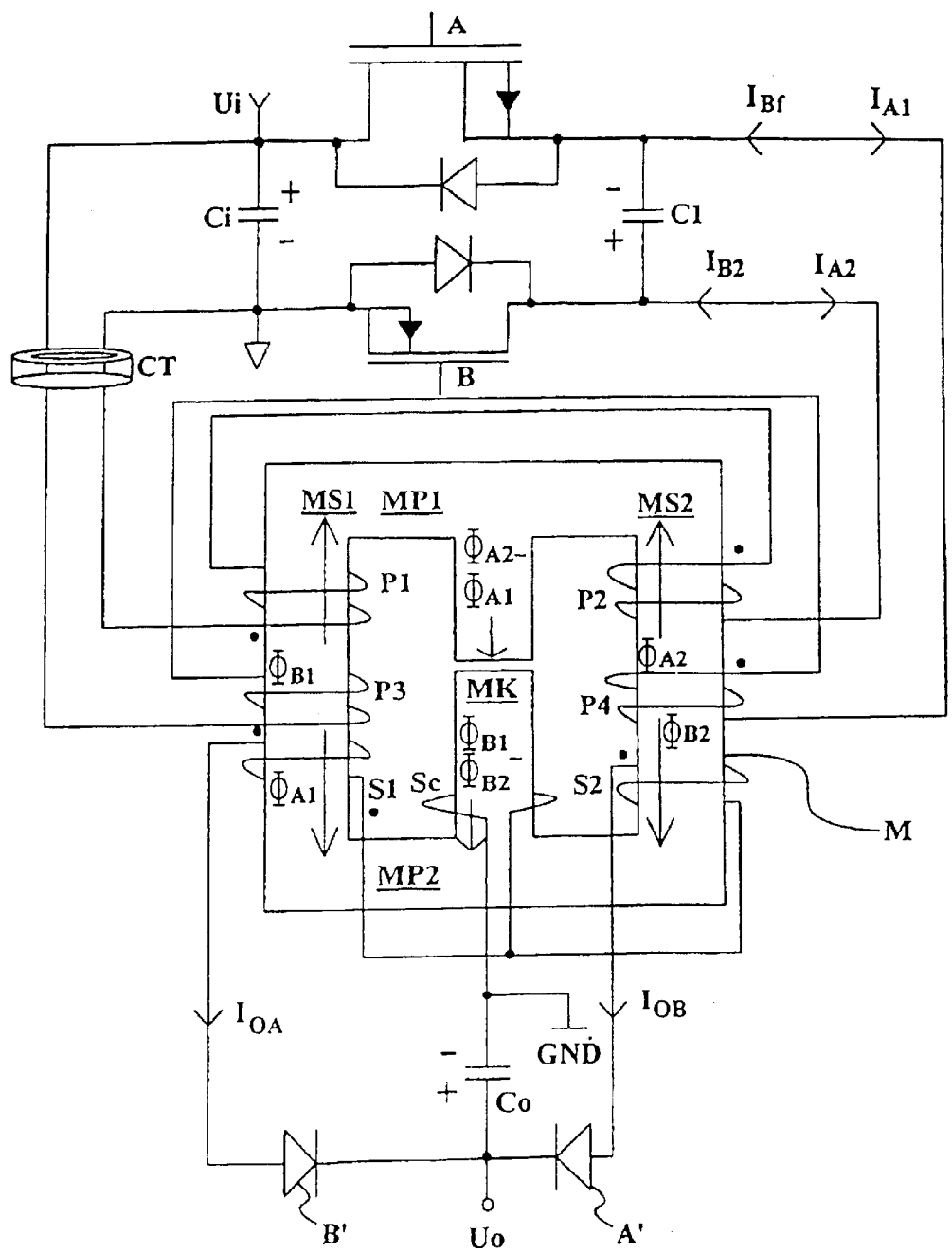
FIG. 5 shows the directions of the magnetic flux in different switching situations.

At instant t0, switch A is turned on and a current starts flowing in the primary windings along the routes indicated by arrows IA1 and IA2. The voltage across the windings produces a change in the magnetic flux in the magnetic paths of the windings. The direction of the magnetic fluxes induced can be determined by the right hand rule. In FIG. 5, the flux direction is indicated on each leg of the component separately. The magnetic flux induced by the primary current induces a voltage in the secondary windings S1, S2 and in the center leg winding Sc. In the secondary windings, the polarities of the voltages are as follows. In winding S2, the end connected to switching element A' gets a negative polarity and the end going to the center leg gets a positive polarity, in other words, switching element B' blocks current flow in winding S2. The end of winding S1 connected to switching element B' gets a positive polarity and the end going to the center leg gets a negative polarity, so switching element B' is forward biased and starts conducting. At the same time, the change in the center leg flux causes the grounded end of the center leg winding to become positive and the end connected to the secondary windings to become negative. The potential difference produced across the ends of the center leg winding is smaller than the potential difference across the ends of secondary winding S1, so a current starts flowing through switching element B' to the output Uo.

The primary and secondary windings are subject to the same laws, so the flux change produced by the primary winding on leg MS1 of the core cannot exceed the limit value determined by the output and center leg voltage. Due to the limitation imposed by the secondary winding, the input voltage is distributed with respect to the primary windings so that the voltage remaining across the windings on leg MS2 is higher than the voltage across the windings on leg MS1. For the magnetic flux, this means that the flux change on leg MS1 is smaller than on leg MS2.

In FIG. 5, the magnitude and direction of flux change are represented by arrows, on leg MS1 by arrow $\Phi A1$ and on leg MS2 by arrow $\Phi A2$. Since the magnetic flux is continuous, the center leg flux must equal the sum $\Phi A1-\Phi A2$ of the magnetic fluxes on the side legs. It can be observed that this summed flux magnetizes the center leg MK in the downward direction. In fact, the magnetic flux on the center leg MK is also affected by winding Sc.

Skipping time interval t1–t2, let us now consider time interval t2–t3. At instant t2, switch B is turned on and a current starts flowing in the primary windings along the routes indicated by arrows IB1 and IB2. The voltage across the windings produces a change in the magnetic flux in the magnetic paths of the windings as in time interval t0–t1. The direction of the magnetic fluxes induced can be determined by the right hand rule. In FIG. 5, the flux direction is indicated on each leg of the component separately. The magnetic flux induced by the primary current induces a voltage in the secondary windings S1, S2 and in the winding Sc on the center leg MK.

In the secondary windings S1, S2, the polarities of the voltages are as follows. In winding S1, the end connected to switching element B' gets a negative polarity and the end going to the center leg MK gets a positive polarity, in other words, switching element B' blocks current flow in winding S1. The end of winding S2 connected to switching element A' gets a positive polarity and the end going to the center leg gets a negative polarity, switching element A' is forward biased and starts conducting.

At the same time, the change in the center leg flux causes the grounded end of the center leg winding to become positive and the end connected to the secondary windings to become negative. The potential difference produced across the ends of the center leg winding is smaller than the potential difference across the ends of secondary winding S2, therefore a current starts flowing through switching element A' to the output Uo.

As a result of symmetric operation, the flux variation in the core M takes place symmetrically as compared with time interval t0–t1. In other words, the change in the flux produced by the primary winding on leg MS2 of the core M cannot be larger than the value to which it is limited by the output and center leg MK voltages. Due to the limitation imposed by the secondary winding, the voltage fed in is distributed with respect to the primary windings so that the voltage remaining across the windings on leg MS1 is higher than the voltage remaining across the windings on leg MS2. For the magnetic flux, this means that the flux change on leg MS2 is smaller than on leg MS1.

In FIG. 5, the magnitude and direction of the flux change are represented by arrows, on leg MS1 $\Phi$B1 and on leg MS2 $\Phi$B2. Since the magnetic flux is continuous, the center leg flux must equal the sum $\Phi$B1–$\Phi$B2 of the magnetic fluxes on the side legs. It can be observed that this summed flux magnetizes the center leg MK in the downward direction. At this point, a significant difference from switching cycle t0–t1 is observed. Although the operation is symmetrical, the polarity of the summed magnetic flux appearing on the center leg MK is not reversed. The result is that a direct-current magnetic flux component is produced on the center leg MK. The existence of a direct-current component on the center leg MK means that there must be direct-current components on the side legs MS1, MS2 as well.

In the switching cycle, time intervals t1–t2 and t2–t3 are identical, so they can be described together in the analysis. At instant t1, switch A is turned off. A current flows in the primary windings as indicated in the description of the input stage, so the primary current has no effect on the magnetic flux of the component at all. The energy stored in the air gap G in the center leg MK is discharged, so the flux change on the center leg MK is in the same direction as it had been when the switch was conducting. Thus, the current in winding S1 continues flowing in the same direction as when the switch was conducting. On leg MS2, the polarity of the magnetic flux is reversed. The reversal of the direction of change induces in winding S2 a voltage that forward-biases switching element A', and a current starts flowing to the output. The output current Io is divided almost equally between windings S1 and S2. On the center leg MK, too, a reversal of polarity of the change of magnetic flux takes place. The positive end of the voltage induced in the winding Sc on the center leg MK is on the secondary windings and the negative end is at ground. It can be established that the voltages in the secondary windings on the side legs MS1, MS2 and in the winding on the center leg MK are summed.

FIG. 6a–6d present alternative embodiments of the primary side circuit to be used in the invention. FIG. 6a presents an embodiment of a symmetrical push-pull circuit. In this embodiment, the common mode noise current switched through the stray capacitance between the primary and secondary sides can be reduced and rendered symmetrical on both side columns MS1, MS2. Correspondingly, a disadvantage is floating control of the primary side switching elements and the increase of the number of external ends of the primary winding from four to eight. The converter has two switching elements A, B and two capacitors C1, C2 arranged on the primary side so that the first switching element A is connected in series between two primary windings P1, P2 and the second switching element B correspondingly in series between the other two primary windings P3, P4. The first capacitor C1 is connected to the first side of the first switching element A and to the second side of the second switching element B while the second capacitor C2 is connected to the second side of the first switching element A and to the first side of the second switching element B.

FIG. 6b presents a conventional push-pull circuit, in which case the integrated magnetic component functions in a manner corresponding to the above description. Arranged on the primary side of the converter are four windings P1, P2, P3, P4 so that two windings P1, P2 are connected in series around the first and second side legs MS1, MS2. The magnetic flux generated by windings P1, P2 flows in the same direction on both side legs MS1, MS2. The other two windings P3, P4 are connected in a corresponding manner so that they produce a magnetic flux in the opposite direction relative to the former windings on the same side leg. Arranged on the primary side are two switching elements A, B and a capacitor Ci, the first and the second switching elements A, B being connected at one end in series with two primary windings P1, P2 and at the other end to the second pole of the supply voltage Ui. The capacitor Ci is connected in parallel with the supply voltage Ui.

Figure 6C:
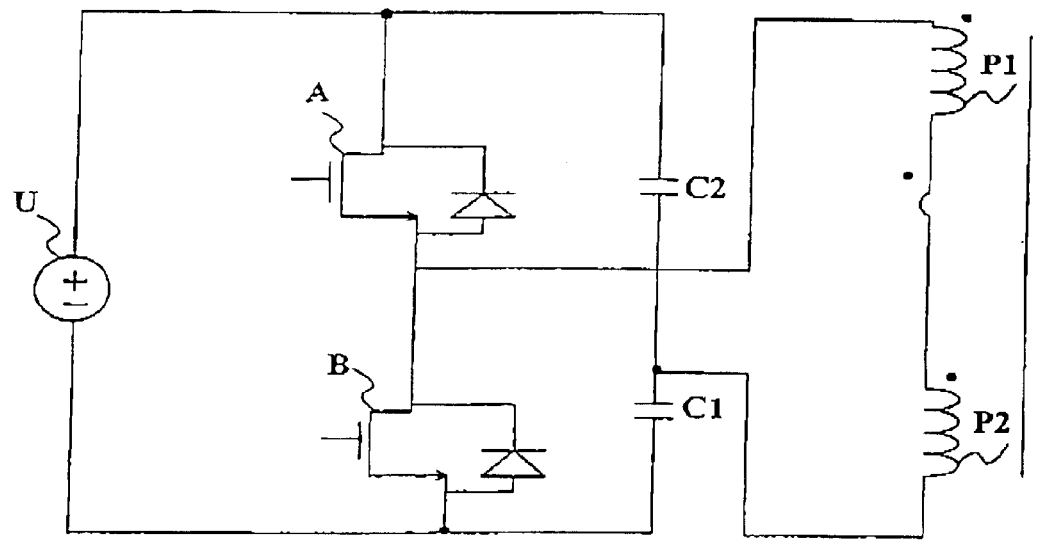
Figure 6D:
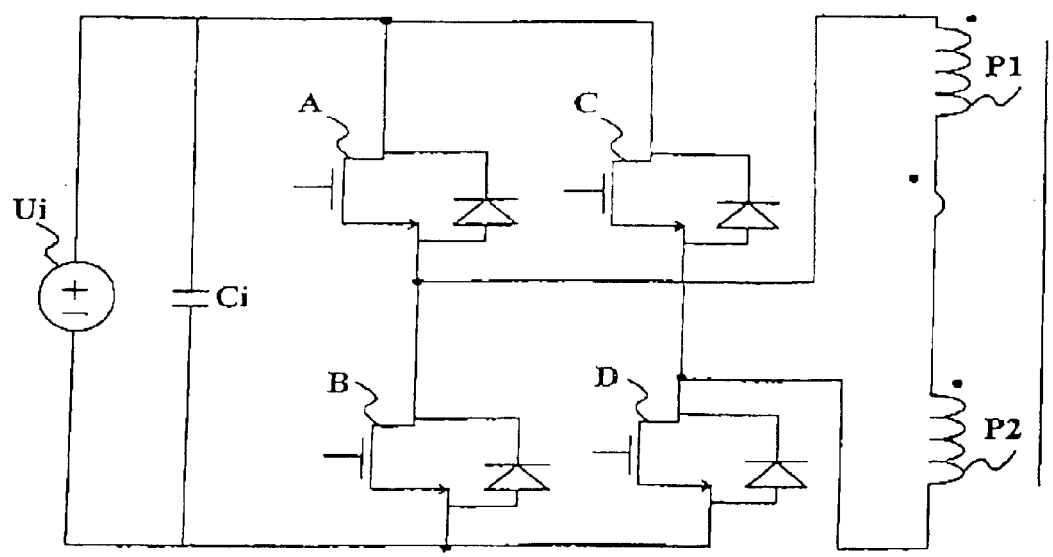

FIG. 6c and 6d present half-bridge and fullbridge versions of the circuit. In these cases, one of the primary winding pairs is left out.

In FIG. 6c, the primary side is provided with two switching elements A, B, two capacitors C1, C2 and two windings P1, P2 so that the switching elements A, B and capacitors C1, C2 form a half-bridge circuit. The windings P1, P2 are connected in series so that the magnetic flux generated by them flows in the same direction in both side legs MS1, MS2 and the windings are connected by one end between the switching elements A, B and by the other end between the capacitors C1, C2.

In FIG. 6d, the primary side is provided with four switching elements A, B, C, D, a capacitor Ci and two windings P1, P2 so that the switching elements form a full-bridge circuit. The capacitor Ci is connected in parallel with the supply voltage Ui. The windings P1, P2 are connected in series so that the magnetic flux generated by them flows in the same direction in both side legs MS1, MS2 and the windings are connected by one end between two switching elements A, B and by the other end between the other two switching elements C, D.

Figure 7A:
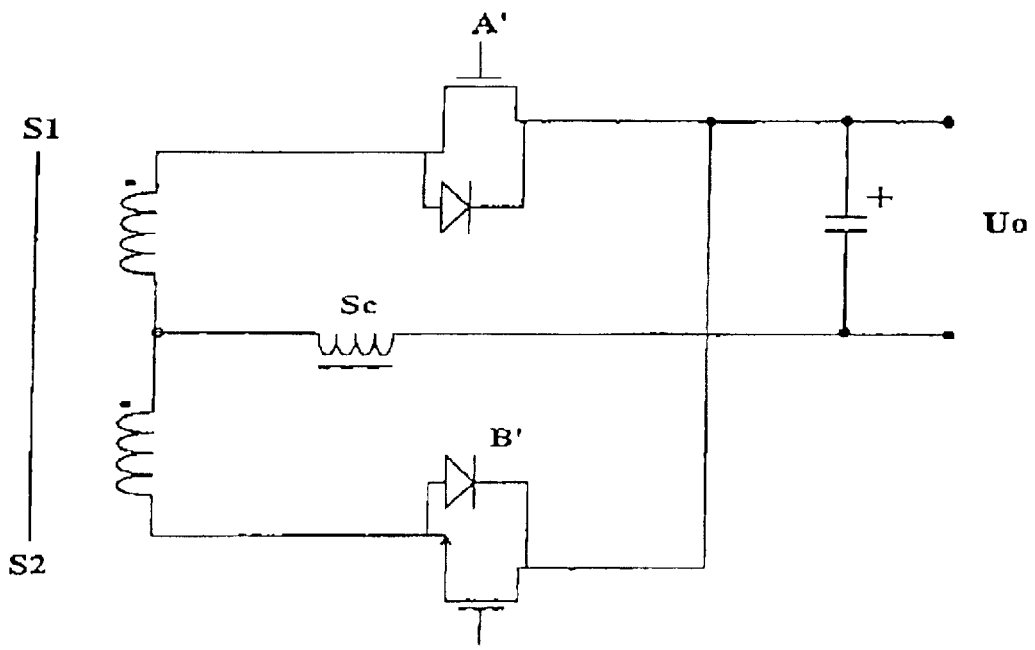

FIG. 7a–7d present alternative embodiments of the secondary side circuit to be used in the invention. FIG. 7a presents another embodiment of a synchronous rectifier. In this solution, the drain potential used for cooling remains stable, but a drawback is floating control of the switching elements A', B'. The first end of the filter coil Sc winding is connected between the windings on the first and second side legs MS1, MS2 and the other end is connected to the first pole of the output voltage Uo of the converter. The secondary side is provided with a third and a fourth switching element A', B' connected in series with the secondary winding, and the second pole of the output voltage Uo of the converter is placed between the third and fourth switching elements A', B'.

Figure 7B:
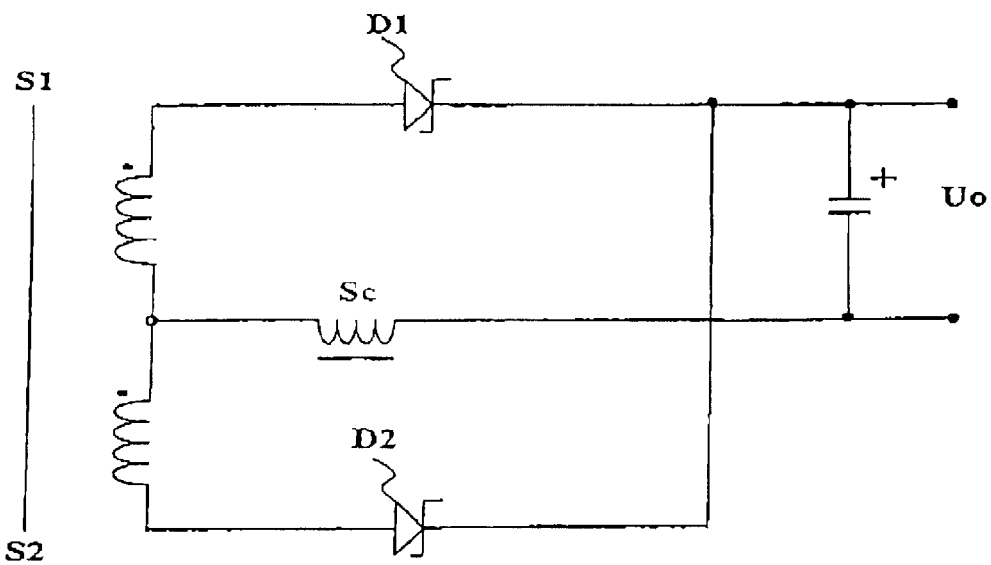

FIG. 7b presents a circuit corresponding to the preceding one, except that the switching elements have been replaced with diodes. Provided on the secondary side are a first and a second diode D1, D2 connected in series with the secondary winding S1, S2, the second pole of the output voltage Uo of the converter being disposed between the first and the second diodes D1, D2.

Figure 7C:
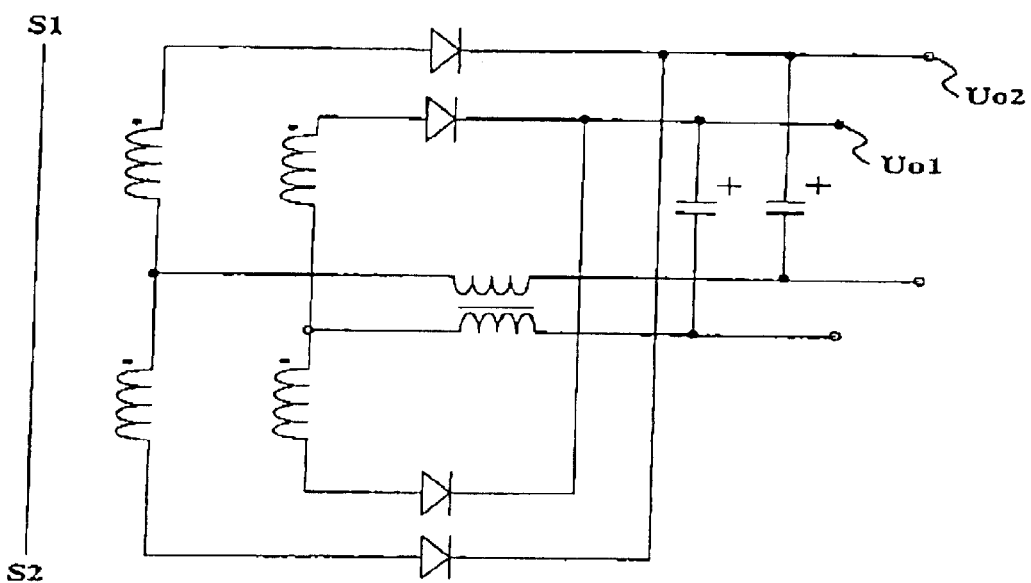
Figure 7D:
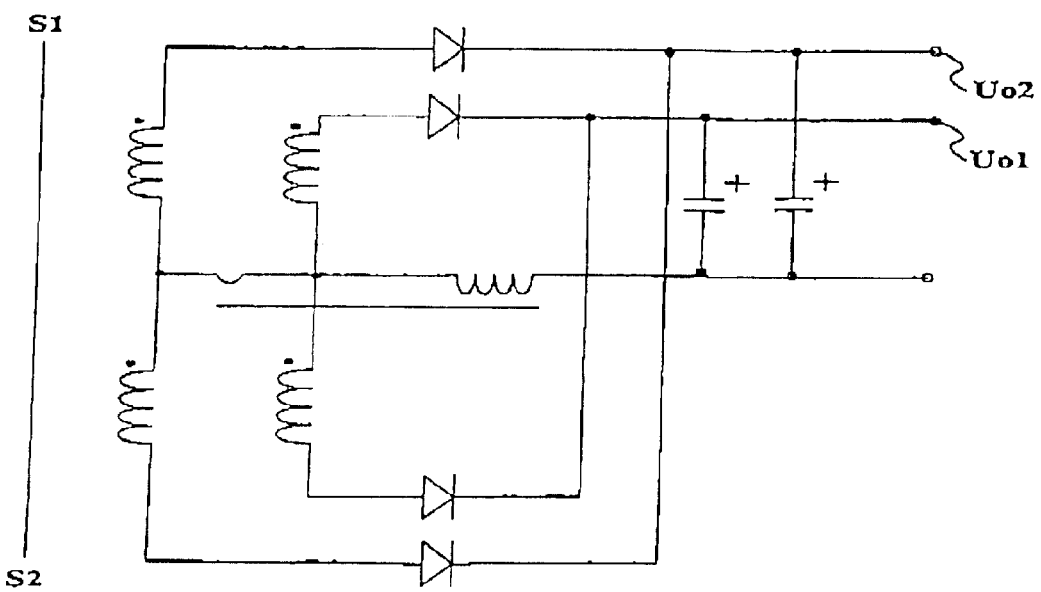

FIG. 7d presents a solution for producing two output voltages with a common ground potential and in FIG. 7c with floating output voltages. In this case, at least two different voltage outputs Uo1, Uo2 are provided on the secondary side, two windings being connected for each output voltage around the first and second side legs. A corresponding implementation, in which several secondary windings are provided on the secondary side, can be used to produce several different output voltages.

Figure 8B:
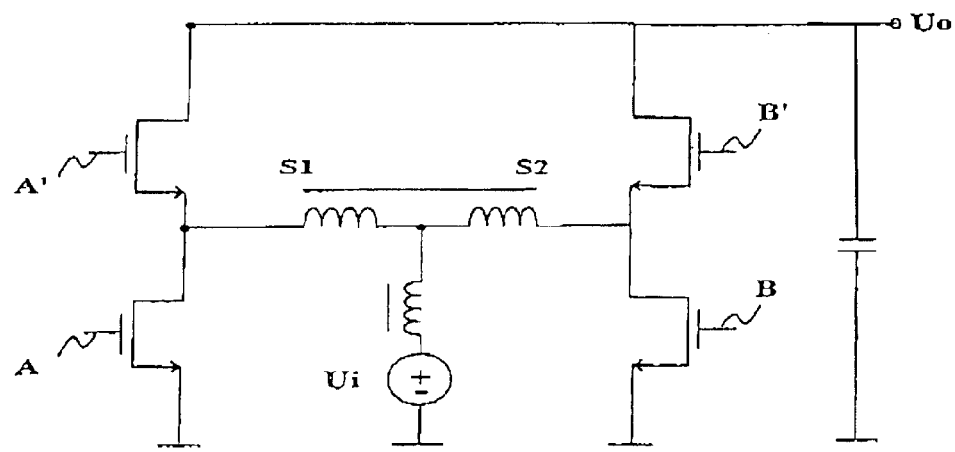

FIG. 8a and 8b present two embodiments of chopper regulators according to the invention. FIG. 8a presents a push-pull synchronous buck-type regulator and FIG. 8b presents a push-pull synchronous boost-type regulator.

The invention is not restricted to the examples of its embodiments described above; instead, many variations are possible within the scope of the inventive idea defined in the claims.

What is claimed is:

1. Chopper-type direct-current converter comprising:
   a magnetic core, which comprises:
      a first and a second side leg, the ends of which are connected to each other with end pieces; and
      a center leg provided with an air gap and connected to the end pieces between the first and second side legs; around which magnetic core are arranged:
      a primary winding;
      a secondary winding; and
      a secondary side filter coil; where
      the filter coil is wound around the center leg; and
      the primary and secondary windings are wound around the side legs so that the resulting magnetic fluxes associated with the primary and secondary windings flow in the same direction en in the side legs, and so that the magnetic return flux flows in the same direction en in the center leg as the magnetic flux associated with the filter coil.

2. Converter as defined in claim 1, wherein the primary side of the converter is provided with four primary windings, two primary windings being connected in series around the first and the second side legs so that the magnetic fluxes associated with the primary windings flow in the same circular direction along the perimeter of the magnetic core.

3. Converter as claimed in claim 2, wherein the primary side of the converter is provided with two switching elements and two capacitors in such manner that:
   the first switching element is connected in series between two primary windings and the second switching element correspondingly in series between the other two primary windings; and
   the first capacitor is connected to a first side of the first switching element and to a second side of the second switching element and the second capacitor is connected to a second side of the first switching element and to a first side of the second switching element.

4. Converter as defined in claim 1, wherein the secondary side of the converter is provided with two secondary windings connected in series around the first and the second side legs so that the magnetic flux associated with a secondary winding flows in a direction opposite to the direction of the magnetic flux associated with the primary winding placed on the same side leg.

5. Converter as defined in claim 1, wherein:
   the primary side is provided with series-connected first and second switching elements, which are connected in parallel with an input voltage and which serve to control the primary windings; and
   the primary side is provided with two capacitors, the first capacitor being connected between the switching elements and the second capacitor in parallel with the input voltage.

6. Converter as defined in claim 5, wherein the secondary side is provided with a third and a fourth switching element connected in series with the secondary winding and a second pole of an output voltage of the converter is disposed between the third and fourth switching elements.

7. Converter as defined in claim 1, wherein the primary side of the converter is provided with four windings in such manner that:
   first two windings are connected in series around the first and second side legs;
   the magnetic flux produced by associated with windings flows in the same circular direction along the perimeter of the magnetic core; and
   the other two windings are connected in a corresponding manner so that the windings produce a magnetic flux in a circular direction along the perimeter of the magnetic core, the direction of which is opposite to the one associated with the first two windings.

8. Converter as defined in claim 7, wherein the primary side is provided with two switching elements and a capacitor in such manner that:
   the first and second switching elements are connected by one end in series with two primary windings and by the other end to one pole of the input voltage; and
   the capacitor is connected in parallel with an input voltage.

9. Converter as defined in claim 1, wherein the primary side is provided with two switching elements, two capacitors and two windings in such manner that:
   the switching elements and the capacitors are arranged in a half-bridge circuit; and
   the windings are connected in series so that the magnetic flux associated with the windings flows in the same direction on both side legs and the windings are connected by one end between the switching elements and by the other end between the capacitors.

10. Converter as defined in claim 1, wherein the primary side is provided with four switching elements, a capacitor and two windings in such manner that:

the switching elements are arranged in a full bridge circuit;

the capacitor is connected in parallel with the supply voltage; and the windings are connected in series so that the magnetic flux associated with the windings flows in the same direction on both side legs and the windings are connected by one end between two switching elements and by the other end between the other two switching elements.

11. Converter as defined in claim 1, wherein a first end of the filter coil is connected between the secondary windings on the first and second side legs and a second end is connected to a first pole of an output voltage of the converter.

12. Converter as defined in claim 11, wherein the secondary side is provided with a first and a second diode connected in series with the secondary winding and a second pole of the output voltage of the converter is disposed between the first and second diodes.

13. Converter as defined in claim 1, wherein the secondary side is provided with at least two different voltage outputs in such manner that, for each voltage output, two windings are connected around the first and second side legs.

14. Chopper-type regulator, comprising:

a magnetic core, which comprises:

a first and a second side leg, the ends of which are connected to each other with end pieces; and a center leg provided with an air gap and connected to the end pieces between the first and second side legs; around which magnetic core are arranged:

two windings; and a filter coil, wherein the filter coil is disposed around the center leg; and the windings are disposed around the side legs so that the magnetic return flux associated with them flows in the same direction on the center leg as the magnetic flux associated with the filter coil.

* * * * *